(12) United States Patent
Valori et al.

(10) Patent No.: US 11,754,518 B2
(45) Date of Patent: Sep. 12, 2023

(54) METHODS AND SYSTEMS TO DETERMINE TORTUOSITY OF ROCK AND FLUIDS IN POROUS MEDIA

(71) Applicants: Schlumberger Technology Corporation, Sugar Land, TX (US); Saudi Arabian Oil Company, Dhahran (SA)

(72) Inventors: Andrea Valori, Al-Khobar (SA); Salah Mohammed Al-Ofi, Northern Khobar (SA); Wael Abdallah, Dhahran (SA); Marie Van Steene, As Sakhir (BH); Chengbing Liu, Dhahran (SA); Shouxiang Ma, Dhahran (SA)

(73) Assignees: SCHLUMBERGER TECHNOLOGY CORPORATION, Sugar Land, TX (US); SAUDI ARABIAN OIL COMPANY, Dhahran (SA)

( * ) Notice: Subject to any disclaimer, the term of this patent is extended or adjusted under 35 U.S.C. 154(b) by 92 days.

(21) Appl. No.: 17/429,711

(22) PCT Filed: Feb. 11, 2020

(86) PCT No.: PCT/US2020/017689
§ 371 (c)(1),
(2) Date: Aug. 10, 2021

(87) PCT Pub. No.: WO2020/167783
PCT Pub. Date: Aug. 20, 2020

(65) Prior Publication Data
US 2022/0205937 A1 Jun. 30, 2022

Related U.S. Application Data

(60) Provisional application No. 62/803,902, filed on Feb. 11, 2019.

(51) Int. Cl.
*G01N 24/08* (2006.01)
*G01V 3/20* (2006.01)
(Continued)

(52) U.S. Cl.
CPC ............. *G01N 24/081* (2013.01); *G01V 3/20* (2013.01); *G01V 3/32* (2013.01); *G01V 3/38* (2013.01)

(58) Field of Classification Search
None
See application file for complete search history.

(56) References Cited

U.S. PATENT DOCUMENTS 8,636,061 B2   1/2014   Mosse et al.
9,291,050 B2   3/2016   Seleznev et al.
(Continued)

FOREIGN PATENT DOCUMENTS

WO   2013074593 A1   5/2013

OTHER PUBLICATIONS

International Preliminary Report on Patentability issued in the related PCT Application PCT/US2020/017689 dated Aug. 26, 2021, 6 pages.

(Continued)

*Primary Examiner* — Douglas X Rodriguez

(57) ABSTRACT

Methods and systems are provided that employ a combination of dielectric dispersion measurement(s) and Nuclear Magnetic Resonance (NMR) measurement(s) to determine data that characterizes tortuosity of rock and data that characterizes tortuosity of fluid phases in the rock independently from one another.

14 Claims, 8 Drawing Sheets

(51) Int. Cl.
*G01V 3/32* (2006.01)
*G01V 3/38* (2006.01)

(56) References Cited

U.S. PATENT DOCUMENTS

| | | |
|---|---|---|
| 2006/0181274 A1 | 8/2006 | Freedman |
| 2013/0113480 A1 | 5/2013 | Kadayam Viswanathan et al. |
| 2014/0203806 A1 | 7/2014 | Grunewald et al. |
| 2016/0334346 A1* | 11/2016 | Cao Minh ............ G01R 33/448 |
| 2017/0123104 A1 | 5/2017 | Donadille et al. |

OTHER PUBLICATIONS

Abdelaal, A. F., K. A. A. Daghar, R. Ramamoorthy, J. Brahmakulam, J. C. Hall, B. Baguenane, M. B. K. A. Marzooqi, and O. Favre. 2013. "Integration of dielectric dispersion and 3D NMR characterizes the texture and wettability of a cretaceous carbonate reservoir." SPE Middle East Oil and Gas Show and Conference (12 pages).

Archie, G. 1942. "The Electrical Resistivity Log as an Aid in Determining Some Reservoir Characteristics" Transactions of the AIME (146)—9 pages.

Chen, Y., and D. Or. 2006. "Geometrical Factors and Interfacial Processes Affecting Complex Dielectric Permittivity of Partially Saturated Porous Media." Water Resources Research 42: 1-9.

Donadille, J. M., and O. Faivre. 2015. "Water Complex Permittivty Model for Dielectric Logging." SPE Middle East Oil Gas Show and Conference. Manama, Bahrain: SPE-172566-MS (13 pages).

Hizem, M., H. Budan, B. Deville, O. Faivre, L. Mosse, and M Simon. 2008. "Dielectric Dispersion: A New Wireline Petrophysical Measurement." SPE Annual Technical Conference and Exhibition, Sep. 21-24. Denver, Colorado, USA: SPE 116130. doi:10.2118/116130-MS (21 pages).

Minh, C.C., S. Crary, P.M. Singer, A. Valori, N. Bachman, G.G. Hursan, S.M. Ma, A. Belowi, and G. Kraishan. 2015. "Determination Of Wettability From Magnetic Resonance Relaxation and Diffusion Measurements On Fresh-State Cores." SPWLA 56th Annual Logging Symposium (15 pages).

Pairoys, F., Al-Zoukani, A., Nicot, B., Valori, A., Ali, F., Zhang, T., Ligneul, P., Akbar, M. 2011. "Multi-Physics Approach for Aging Assessment of Carbonate Rocks." Society of Petroleum Engineers. Al-Khobar, Saudi Arabia. doi:10.2118/149080-MS (18 pages).

Rampurawala, M., P. Sangani, A. Iqbal, O. Yepes, and M. Murray. 2015. "Quantatative Viscosity, Movable Oil, and Texture Evaluation in a Heavy Oil Carbonate Reservoir Using Advanced Dielectric and NMR Log Integration." SPE-172777-MS (15 pages).

Seleznev, N., T. Habashy, A. Boyd, and M. Hizem. 2006. "Formation Properties Derived from a Multi-Frequency Dielectric Measurement." SPWLA 47th Annual Logging Symposium (12 pages).

Sen, P. 1984. "Grain Shape Effects on Dielectric and Electrical Properties of Rocks." Geophysics 49: 586-587.

Stroud, D., G. Milton, and B. De. 1986. "Analytical Model for Dielectric Response of Brine-Saturated Rocks." Physical Review B 34 (8)—9 pages.

Venkataramanan, L., J.M. Donadille, S. L. Reeder, M. Van Steene, Gkortsas, V. M., K. Fellah, et al. 2016. "A New Method to Estimate Cementation and Saturation Exponents from Dielectric Dispersion Data." SPE Annual Technical Conference and Exhibition. Dubai, UAE: SPE. SPE-181451-MS (19 pages).

International Search Report and Written Opinion issued in the related PCT Application PCT/US2020/017689, dated Jun. 9, 2020 (9 pages).

* cited by examiner

METHODS AND SYSTEMS TO DETERMINE TORTUOSITY OF ROCK AND FLUIDS IN POROUS MEDIA

CROSS-REFERENCE TO RELATED APPLICATION(S)

The application claims priority from U.S. Ser. No. 62/803,902, filed Feb. 11, 2019, the complete disclosure of which is hereby incorporated by reference herein.

BACKGROUND

Tortuosity is a general geometrical property of a specific geometrical structure. The easiest way to represent it is in two-dimensions, where it can be defined by the ratio between the length of a line L and a cord C of a line (see FIG. 1). With some care, this definition can be extended to three dimensions and geometry of any complexity, including, for our purposes, porous media such as rocks. Note that tortuosity is a general concept applicable to any porous media with complex structure. Although we are familiar with applications to reservoir rocks, tortuosity is a parameter required to describe the flow, diffusion, and in general transport properties of porous media. Examples of such porous media include concrete and cement-based materials (where impermeability is a fundamental property to ensure long durability). In this case, easy flow is detrimental and cause premature degradation. Another common porous material used in construction is, for example, wood. Other porous media on which tortuosity is an important parameter are ceramics (for example, ceramics used in catalytic reactors).

The traditional way to measure tortuosity of rock (also referred to herein as "tortuosity of rock pore space"), or a parameter closely correlated to it, is by use of electrical currents. Assuming the rock is saturated with a conductive fluid (brine) of known conductivity, from Ohm's law, the length of the geometrical path connecting the pore space ($T_{ps}$) can be put in linear correlation with the resistivity of the path, and therefore the ratio of resistivity through the rock and through the filling fluids can be converted to the tortuosity of the rock pore space. The tortuosity of the rock pore space is a parameter of the rock geometrical structure itself and does not depend on the properties of the fluid filling the pore space. In the Archie equation the parameter that is dependent on the tortuosity of the rock pore space is the cementation exponent (m).

The resistivity across the pore space of the rock can also be measured if the pore space is not fully filled by a conductive phase (brine), but also if a non-conductive fluid (hydrocarbon) is present in the pore space. In this case, the resistivity across the pore space of the rock will be dependent on the tortuosity of the conductive phase that fills the pore space of the rock, rather than the tortuosity of the pore space itself. The change of shape, connectivity and tortuosity of the conductive phase as a function of saturation is the basis of the Archie equation, which is commonly used in log analysis interpretation. The parameter in the Archie equation that represent the way resistivity (and therefore water phase tortuosity) varies with saturation is the saturation exponent n.

While using electrical current flow to measure rock tortuosity, only the tortuosity of the conducting phase can be measured. However, the geometrical tortuosity can be defined for any arbitrary geometrical distribution, and therefore also for the hydrocarbon phase distribution. In the case of petrophysics and reservoir rocks, resistivity measurements are restricted to applications for brine and aqueous phase, and not for the oil or gas phases. In the presence of two fluids (e.g. oil and water), only the water phase tortuosity can be measured, however, the tortuosity of the oil phase is still well defined (even if it cannot be measured by the resistivity measurement).

Dielectric measurements (or dielectric dispersion measurements) are sensitive to water phase in the formation due to water's dominant molecular polarization compared to other rock constitutes (Donadille et al, "Water Complex Permittivity Model for Dielectric Logging." *SPE Middle East Oil & Gas Show and Conference*. Manama, Bahrain: SPE-172566-M, 2015). The dielectric measurement in a porous media are frequency dependent for a porous media due to the interfacial polarization governed by Maxwell-Wagner effect, which is a function of pore structure and fluids distribution (Chen et al., "Geometrical Factors and Interfacial Processes Affecting Complex Dielectric Permittivity of Partially Saturated Porous Media"; *Water Resources Research* 42: 1-9, 2006). Downhole tools such as the one found in co-owned U.S. Pat. No. 8,636,061 can perform dielectric dispersion measurements on near wellbore formation rock to obtain dielectric data of the near wellbore formation rock. Petrophysical parameters such as water-filled porosity and a parameter representing the water phase tortuosity (MN) can be computed from the obtained dielectric dispersion data using effective medium theory models (Stroud et al., "Analytical Model for Dielectric Response of Brine-Saturated Rocks"; *Physical Review B* 34 (8), 1986; Seleznev et al., "Formation Properties Derived from a Multi-Frequency Dielectric Measurement." *SPWLA 47th Annual Logging Symposium*, 2006; and Sen, "Grain Shape Effects on Dielectric and Electrical Properties of Rocks"; *Geophysics* 49: 586-587, 1984). The inverted dielectric parameter MN has been found to be analogous to Archie's cementation exponent (m) for a measured formation which is fully saturated with water (Stroud, Milton and De 1986). For partially saturated formation, the inverted dielectric parameter MN combines the effects of both Archie exponents, the cementation exponent (m) and saturation exponent (n) (Hizem et al., "Dielectric Dispersion: A New Wireline Petrophysical Measurement." *SPE Annual Technical Conference and Exhibition*, 21-24 September. Denver, Colo., USA: SPE 116130. doi:10.2118/116130-MS, 2008)

Several attempts have been done in the past to separate the effects of the m and n exponents in the Archie equation from a dielectric inverted parameter (MN). Abdelaal, et al. demonstrated a workflow to estimate the saturation exponent (n) from a dielectric inverted parameter MN. They utilized the assumption of low water and mud salt invasion in the formation, and constant cementation exponent extracted from water zone resistivity measurements (Abdelaal et al, "Integration of dielectric dispersion and 3D NMR characterizes the texture and wettability of a cretaceous carbonate reservoir"; *SPE Middle East Oil and Gas Show and Conference*, 2013). The limitations of this approach are the water-based mud invasion is rarely avoidable and the reservoir pore structure and cementation is highly heterogeneous.

Another approach was taken by Venkataramanan et al. to estimate both the m and n exponents in the Archie equation from a large set of dielectric inverted MN data acquired at different depths from a specific well based on similarity of rock types (Venkataramanan et al., "A New Method to Estimate Cementation and Saturation Exponents from Dielectric Dispersion Data"; *SPE Annual Technical Confer-* ence and Exhibition. Dubai, UAE: SPE. SPE-181451-MS, 2016). Proper rock typing is not well established yet and assumption of different rock types to have similar m and n exponents is questionable in which the n exponent is a function of water distribution and wettability which could be different from one depth to another (Pairoys et al., "Multi-Physics Approach for Aging Assessment of Carbonate Rocks"; *Society of Petroleum Engineers*. Al-Khobar, Saudi Arabia. doi:10.2118/149080-MS, 2011).

Despite the challenges involved in understanding the dielectric inverted (MN) data and limitations of methods relating it to Archie's m and n exponents, various efforts have been made to utilize dielectric (MN) data to evaluate formation properties influencing reservoir productivity such as wettability. In co-owned U.S. Pat. No. 9,291,050, Seleznev et al. provided a workflow to calibrate the saturation exponent (n) extracted from dielectric MN data with core wettability index obtained from laboratory USBM method. However, accurate estimation of the n exponent is not possible without accurate estimation of water saturation and m exponent from the same formation, and it is challenging to estimate both from individual electrical tool or method.

In a recent work done by Rampurawala et al., Nuclear Magnetic Resonance (NMR) and dielectric dispersion logs were integrated to interpret reservoir oil mobility and wettability (Rampurawala et al., "Quantitative Viscosity, Movable Oil, and Texture Evaluation in a Heavy Oil Carbonate Reservoir Using Advanced Dielectric and NMR Log Integration." *SPE*-172777-*MS*, 2015). They found the dielectric MN data to match well to NMR driven m exponents for water wet zones.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure describes methods and systems that employ a combination of Nuclear Magnetic Resonance (NMR) measurement(s) and dielectric dispersion measurement(s) to determine data that characterizes tortuosity of rock and data that characterizes tortuosity of fluid phases in the rock independently from one another. This is possible because in the NMR acquired dataset, the signal attributable to oil and water can be separated. Under the realistic assumption of full water saturation for the smaller pores, data characterizing tortuosity of rock can be determined even when oil is present in bigger pores (and therefore would affect resistivity and dielectric measurements). Combining NMR and dielectric dispersion measurements (where the dispersion measurement specifically targets the water phase tortuosity for the rock), information of both tortuosity of rock and tortuosity of fluid phases in the rock can be extracted

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

The "traditional" way to determine the cementation exponent m of the Archie equation is to use a resistivity measurement and compare the resistivity of the bulk fluid filling the rock ($R_w$) to the resistivity of the rock fully saturated with said fluid ($R_o$). From these measurements, the porosity ($\varphi$) exponent (typically referred to as the cementation exponent m) of the Archie equation is derived as follows:

$$R_w/R_o = \varphi^m \quad \text{(Eq. 2)}$$

The calculation of the cementation exponent m is described in Archie, G. "The Electrical Resistivity Log as an Aid in Determining Some Reservoir Characteristics"; *Transactions of the AIME* (146), 1942. As said, the cementation exponent m depends on the tortuosity of the rock pore space.

If oil is added in the rock pore space, the current path will change, and therefore the resistivity ($R_t$) of the saturated sample will change too. In this condition, the measurement is sensitive to the tortuosity of the water phase as caused by both the rock structure and the oil phase. From this measurement, the saturation exponent (n) of the Archie equation can be derived from the resistivity ratio and water saturation ($S_w$) as follows:

$$R_w/R_t = S_w^n \varphi^m \quad \text{(Eq. 3)}$$

where n represents how the conductivity (and therefore indirectly the tortuosity) of the water phase changes with addition of oil. So, what is always correct is that all the measurements are representation of the water (or conductive phase) filled tortuosity.

Because the resistivity measurement is a single measurement from the entire rock sample (typically a plug or core sample), only a single number expression of the water filled tortuosity can be extracted. Consequently, in the case of mixed saturation, it is impossible to separate the tortuosity of the rock (m) and the tortuosity due to added oil (n). This limitation affects both resistivity measurements and dielectric measurements.

Figure 1:
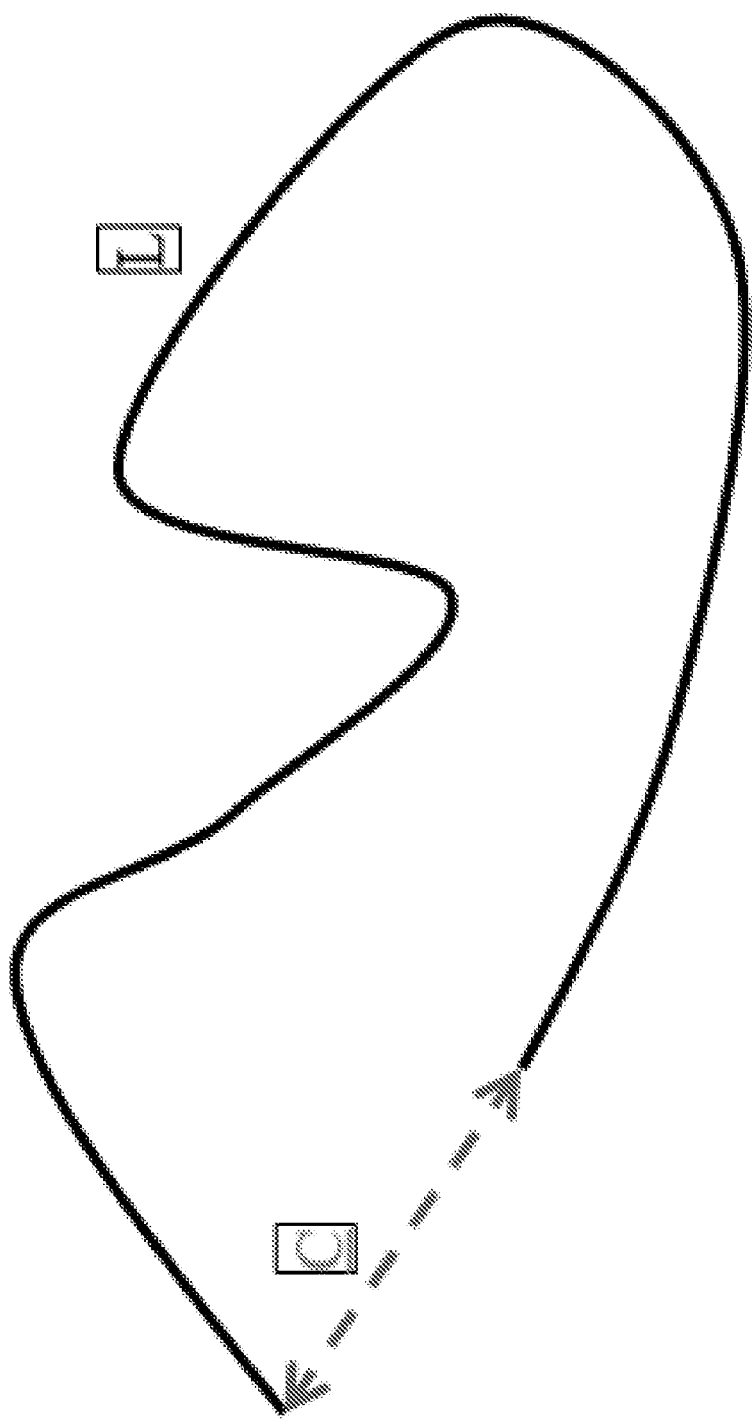
FIG. 1 is a schematic representation of a length L of a generic line as well as cord C along the line.
Figure 2:
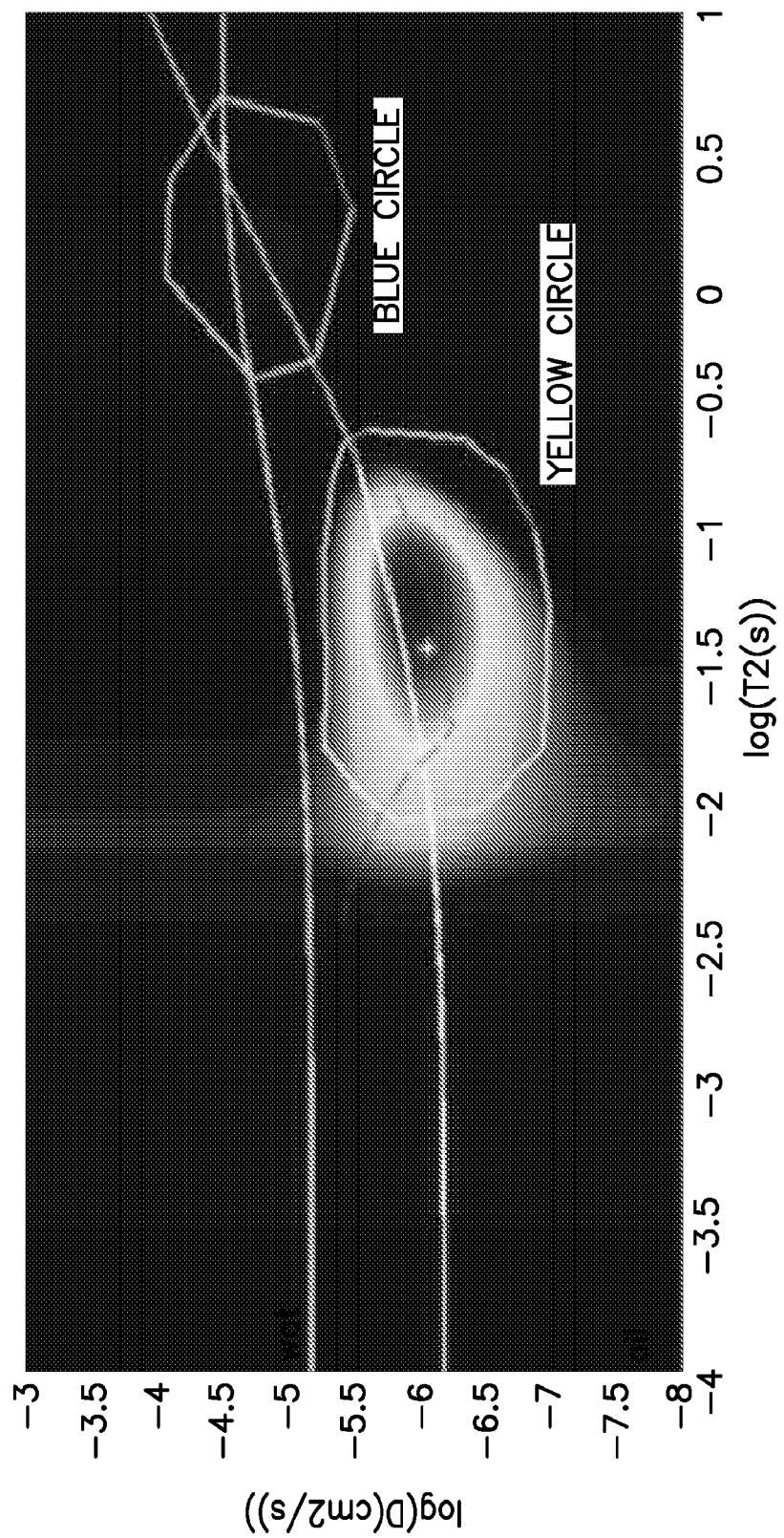
FIG. 2 is diffusion (D)—traverse relaxation time ($T_2$) map of a rock sample showing clear separation of the D-$T_2$ data attributable to oil from the D-$T_2$ data attributable to water; this D-$T_2$ map is obtained from NMR measurements as described in Minh et al., "Determination of Wettability from Magnetic Resonance Relaxation and Diffusion Measurements on Fresh-State Cores"; SPWLA 56th Annual Logging Symposium, 2015, hereinafter Minh. Note that the yellow circle highlights the D-$T_2$ data attributable to the oil phase, while the blue circle highlights the D-$T_2$ data attributable to the water phase.
Figure 3B:
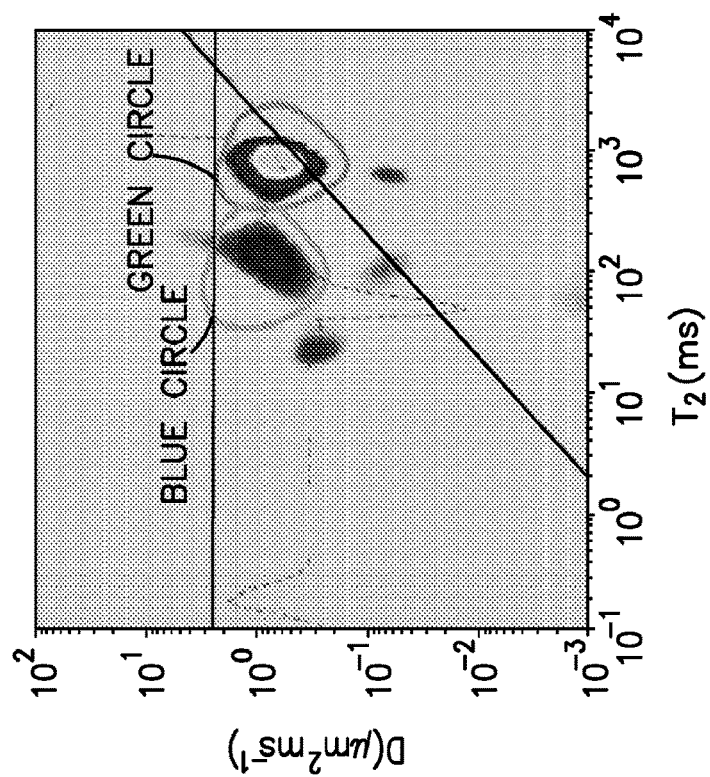
FIGS. 3A and 3B are both D-$T_2$ maps of rock samples showing clear separation of the D-$T_2$ data attributable to oil from the D-$T_2$ attributable to water. Note that the green circles in FIGS. 3A and 3B highlights the D-$T_2$ data attributable to the oil phase, while the blue circles in FIGS. 3A and 3B highlights the D-$T_2$ data attributable to the water phase.
Figure 3A:
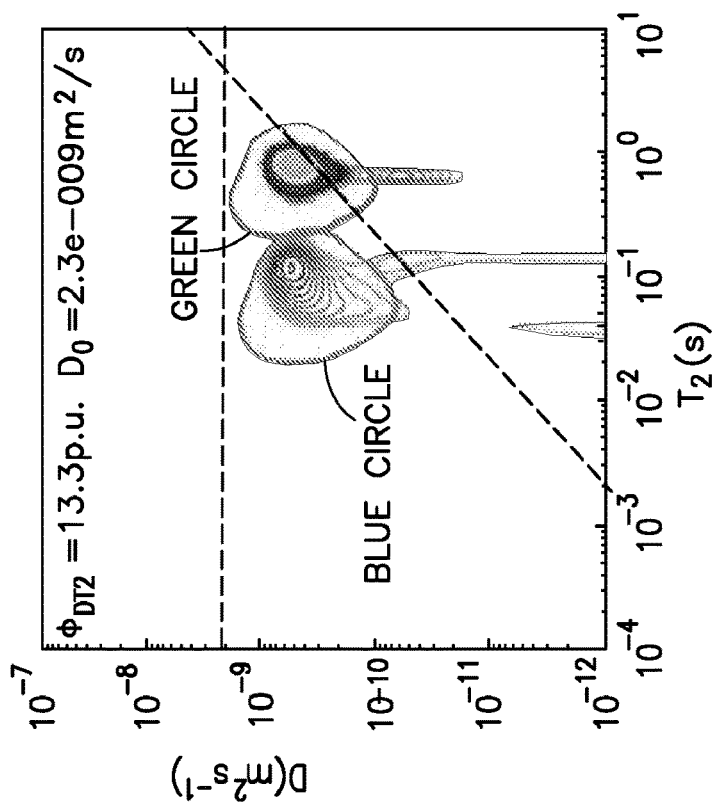

In addition to the flow of electrical current, also the motion of the fluid molecules is also affected by the tortuosity of the fluid phase itself (which is a combination of tortuosity due to the rock and due to the other fluid phase). NMR can measure diffusion and therefore molecular motion. The advantage of NMR is that the typical dataset is much richer than a single scalar point. Measurements can be 2D, 3D (and in principle even higher dimensionality). For example, when diffusion (D) is coupled with transverse relaxation time $T_2$ in a D-$T_2$ experiment, both $T_2$ and D parameters can be determined for each fluid phase. However, if the parameters are the same for oil and water (which is the case when oil is very light), there is no contrast and the method is not applicable, but generally, this is not the case. FIGS. 2, 3A and 3B show examples where the part of the D-$T_2$ data that is attributable to water and the part of the D-$T_2$ data that is attributable to oil are separate from one another.

Being able to detect characteristics of the motion (diffusion) for both fluids separately (oil and water) allows extraction of information on tortuosity of both water and oil filled pore space in the rock separately.

As long as one pore population is fully filled with water (which is typically the case for smaller pores in conventional reservoirs or low oil saturations), the position of this pore population on the D-$T_2$ map will not change and neither will the computed connectivity (tortuosity) of that pore population change. This means that the obtained tortuosity for the considered pore system can be extracted from partially oil saturated samples and the result will be the same as the one extracted from fully water saturated samples. This would refer to the Archie cementation parameter (m) and the tortuosity of the rock. When the considered pore system starts hosting oil, the NMR-extracted tortuosity will be representative of the parameter (MN) as measured by the dielectric tool, which can be related to m and n by the following expression:

$$(\varphi S_w)^{MN} = S_w^n \varphi^m \quad \text{(Eq. 4)}$$

When some oil is present in the rock, it will fill a specific geometry of the pore space. As defined above, the oil geometry will have a geometrical tortuosity assigned to it, therefore, in addition to the tortuosity of the water phase, the tortuosity of the oil phase can also be defined, even if it can't be measured by the resistivity measurement. NMR, being sensitive to the motion of proton bearing molecules, and not only charged particles, can be used to determine both water phase tortuosity (or tortuosity of the pore space of the rock filled with water) and oil phase tortuosity (tortuosity of the pore space of the rock filled with oil). We suggest using a combination of oil phase tortuosity and water phase tortuosity to extract information on the relative permeability of the rock.

One additional implication of being able to extract connectivity (tortuosity) information for each pore system is that, in principle, different tortuosity parameters can be extracted for different pore systems.

From a physics point of view, differences between NMR and resistivity measurements arise from the different length scales in which the measurements are made. Resistivity measures the current flow path along the entire sample. If an insulating layer is placed anywhere on the current path the resulting measurement will be affected equivalently regardless of the position of the insulating layer. NMR detects the movement of the fluid molecules over a relatively short length scale, which depends on the experimental parameters and the diffusion coefficient of the fluids considered. Therefore, if there are pore populations which are not affected by oil invasion, NMR should allow extraction of tortuosity information which is independent of the saturation of other pore populations and equivalent to rock matrix tortuosity.

Figure 4:
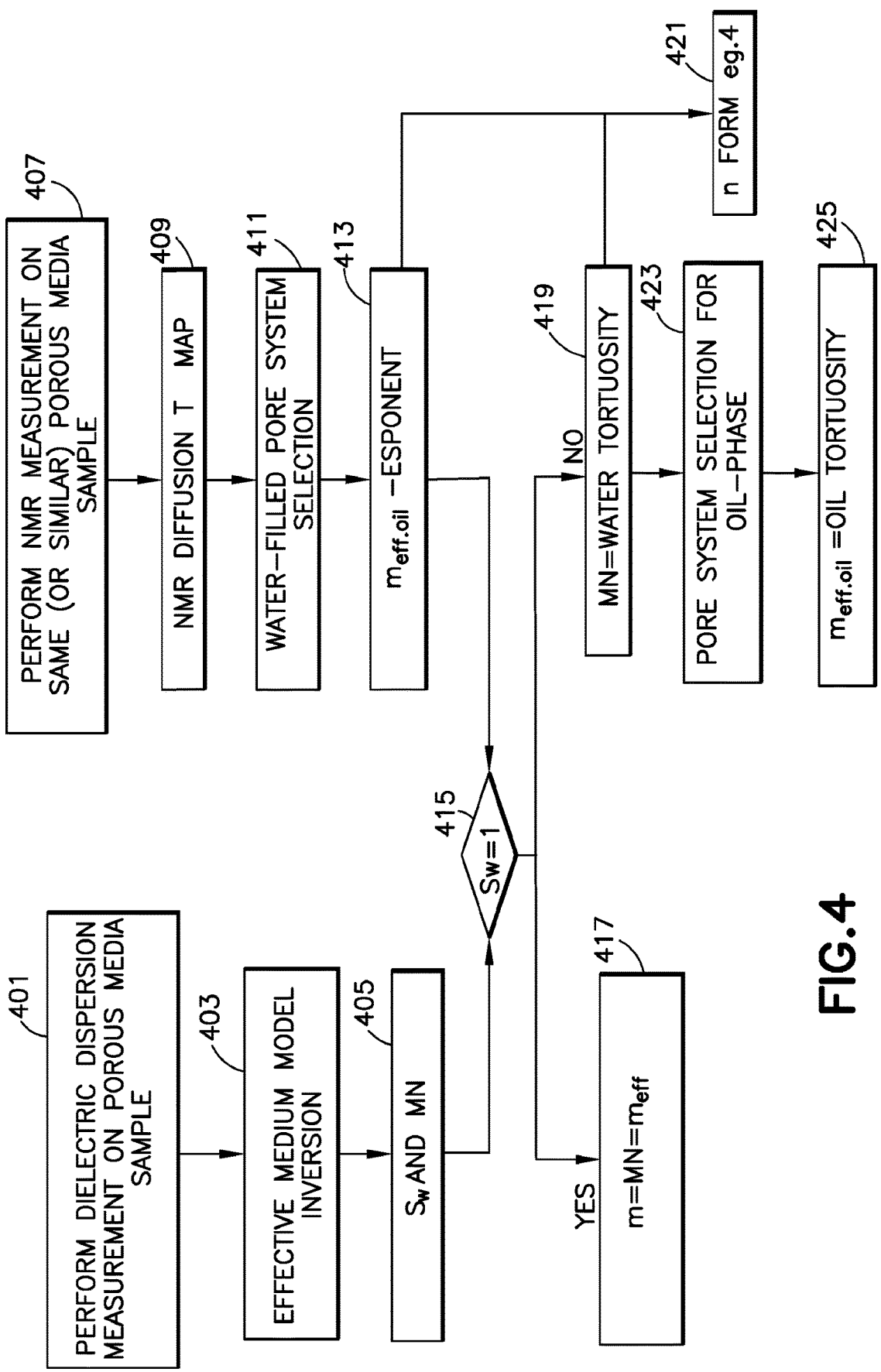
FIG. 4 is a flowchart illustrating a workflow that combines NMR measurement(s) and dielectric dispersion measurement(s) to determine data that characterizes tortuosity of rock and data that characterizes tortuosity of fluid phases in the rock.

There are therefore differences between NMR and resistivity (or dielectric) measurement of tortuosity. Differences include:

NMR Measurements
Can extract both oil and water tortuosity
Are not affected by fluid conductivity (there is a mild effect of salinity as it affects bulk diffusion)
Fails when bulk oil and water have the same D-$T_2$ properties or diffusion can't be measured (bound water/clay) (Minh, et al. 2015)
Resistivity Measurements
Provide a single measure for the entire sample, "long" length scale
Are only sensitive to water filled connectivity
Dielectric Dispersion Measurements
Can extract water conductivity
Are only sensitive to water filled connectivity
Extracts (MN) at partial water saturation Combining the different techniques allows building a workflow that leverages the different sensitivities to derive the parameters m and n. An example of such a workflow is shown in FIG. 4.

In block 401, a dielectric dispersion measurement is performed on a porous media sample, such as on a sample volume of reservoir rock investigated by a downhole dielectric dispersion logging tool (for example, the downhole tool described below with respect to FIGS. 5, 6A and 6B).

In block 403, the dielectric data that is obtained from the dielectric dispersion measurement is inverted by an inversion process based on one or more effective medium models. Examples of such effective medium models are described in Stroud et al., "Analytical Model for Dielectric Response of Brine-Saturated Rocks"; Physical Review B 34 (8), 1986; Seleznev et al., "Formation Properties Derived from a Multi-Frequency Dielectric Measurement"; SPWLA 47th Annual Logging Symposium, 2006; and Sen, P. "Grain Shape Effects on Dielectric and Electrical Properties of Rocks"; Geophysics 49: 586-587, 1984. The result of the inversion process of block 403 are values for a water saturation parameter $S_W$ and an MN parameter (block 405), which are solved by the inversion of the effective medium model(s). The value of the MN parameter is representative of water phase tortuosity of the porous media sample.

In block 407, an NMR measurement is performed on the same or similar porous media sample, such as on the same or similar sample volume of reservoir rock investigated by an NMR logging tool (for example, the downhole tool described below with respect to FIGS. 5 and 7).

In block 409, the NMR data that is obtained from the NMR measurement is processed to build a NMR Diffusion D-$T_2$ map (e.g., FIG. 2 or 3A or 3B) from the NMR data.

In block 411, the NMR Diffusion D-$T_2$ map is processed to partition or select the data attributable to water-filled pores in the Diffusion D-$T_2$ map.

In block 413, the NMR data attributable to water-filled pores in the Diffusion T2 map is used to determine a value for an NMR-based water phase tortuosity exponent ($m_{\mathit{eff,wat}}$). In embodiments, this can involve fitting a restricted diffusion water line to the water signal. Since the position of the line is dependent on $m_{\mathit{eff,wat}}$ the parameter can be extracted.

Note that both answers (the value of $m_{\mathit{eff,wat}}$ of block 413 and the value of the MN parameter of block 405) should be equal for fully water saturated porous media, and they are equivalent to the cementation exponent m of the Archie equation which is a measure of the tortuosity of the rock matrix.

Thus, in block 417, for the case where the porous media sample is fully water saturated and the water saturation parameter $S_W$ is determined to be equal to 1 in block 405, the cementation exponent m of the porous media sample, which is a measure of the tortuosity of the sample, can be equated to the value of $m_{\mathit{eff,wat}}$ of block 413 or the value of the MN parameter of block 405.

For partially water saturated porous media or porous media which is saturated with both water and hydrocarbon (e.g., oil) and the water saturation parameter $S_W$ is determined to be less than 1 in block 405, the value of $m_{\mathit{eff,wat}}$ of block 413 and the value of the MN parameter of block 405 are expected to be different. For this case, the MN parameter of block 405 is interpreted as a measure of the water phase tortuosity of the sample (block 419). In block 421, the NMR-based water phase tortuosity ($m_{\mathit{eff,wat}}$) of block 413 and the dielectric-based water phase tortuosity (MN) of block 405 can be used to compute the saturation exponent n of the sample using Eqn. (4) as described herein. In block 423, the NMR Diffusion D-$T_2$ map of block 409 is processed to partition or select the data attributable to hydrocarbon-filled pores in the Diffusion D-$T_2$ map. In block 425, the NMR data attributable to hydrocarbon-filled pores in the Diffusion D-$T_2$ map is used to determine a value for an NMR-based hydrocarbon phase tortuosity exponent ($m_{\mathit{eff,oil}}$), which is a measure of the hydrocarbon phase tortuosity of the rock. In embodiments, this can be done analogously to the operations of block 413 that calculate the NMR-based water phase tortuosity exponent ($m_{\mathit{eff,wat}}$) by fitting the restricted diffusion line to the experimental data signal.

In this workflow, the following advantages are provided:
- a technique to measure tortuosity for each pore system independently of the filling single fluid.
- a technique to extract cementation exponent (m) for a pore system fully water saturated.
- estimation of oil tortuosity and relative calculated $m_{oil}$
- use of NMR measurement(s) to obtain separate n and m parameters by combination with the dielectric-based MN parameter
- use connectivity/tortuosity of oil and water to extract information on relative permeability and/or wettability, as wettability is strongly correlatable to Archie n.

It is also contemplated that the workflow as described herein can be performed on samples of other porous media (which are different from reservoir rock).

It will be appreciated that the workflow as described herein can employ a dielectric analyzer that performs the dielectric dispersion measurement(s) on porous media (such as reservoir rock) as part of the workflow. The dielectric analyzer can be a downhole logging tool (such as a wireline or logging-while-drilling tool) that is conveyable in a wellbore that traverses the reservoir rock under investigation. For example, see FIGS. 5, 6A and 6B below. Alternatively or additionally, the dielectric analyzer can be a laboratory apparatus, a wellsite apparatus or other material testing apparatus that performs the dielectric dispersion measurement(s) on porous media. The workflow can also employ a Nuclear Magnetic Resonance (NMR) analyzer that performs the NMR measurement(s) on porous media (such as reservoir rock) as part of the workflow. The NMR analyzer can be a downhole logging tool (such as a wireline or logging-while-drilling tool) that is conveyable in a wellbore that traverses the reservoir rock under investigation. For example, see FIGS. 5 and 7 below. Alternatively or additionally, the NMR analyzer can be a laboratory apparatus, a wellsite apparatus or other material testing apparatus that performs the NMR measurement(s) on porous media.

Figure 5:
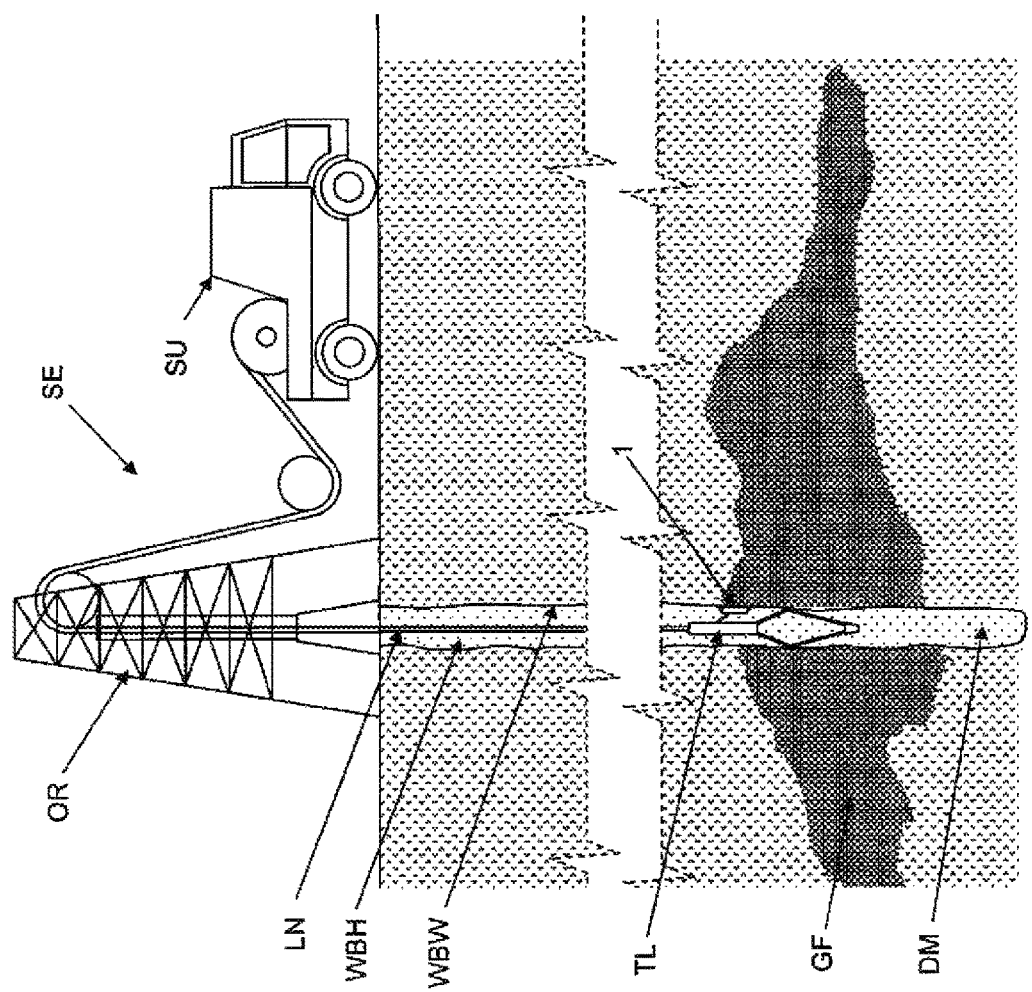
FIG. 5 is a schematic diagram illustrating an example onshore hydrocarbon well location.

FIG. 5 is a schematic diagram that illustrates an example onshore hydrocarbon well location with surface equipment SE above a hydrocarbon geological formation GF after drilling operation has been carried out. At this stage, i.e. before a casing string is run and before cementing operations are carried out, the wellbore WBH filled with a fluid mixture DM, which is typically a mixture of drilling fluid and drilling mud. In this example, the surface equipment SE comprises an oil rig OR and a surface unit SU for deploying a logging tool TL in the wellbore WB. The surface unit may be a vehicle coupled to the logging tool by a wireline cable LN. Further, the surface unit comprises an appropriate device for determining the depth position of the logging tool TL relative to the surface level. The logging tool TL may comprise a centralizer that is configured to ensure a correct axial positioning of the logging tool in the wellbore WBH. The logging tool TL comprises various tools or sensors and provides various measurement data related to the hydrocarbon geological formation GF and/or the fluid mixture DM. These measurement data are collected by the logging tool TL and transmitted to the surface unit SU. The surface unit SU comprises appropriate electronic and software arrangements for processing, analyzing and storing the measurement data provided by the logging tool TL.

It should be appreciated that in an alternative embodiment such processing circuitry is capable of being located downhole in or near the logging tool TL itself. Such processing circuitry is capable of handling all the processing functionality pertaining to the various measurements and models described herein.

Moreover, while FIG. 5 shows a wireline application, it should also be appreciated that the embodiments described herein are equally applicable to logging while drilling applications. There is no need for the logging tool to be limited to an application where it is attached to a separate wire or cable controlling its movements. It is possible for the different functionality of the logging tool to be incorporated into the actual drill pipe itself (for example on the drill collar). This advantageously allows the benefits of the improved imaging techniques described herein to be used during the initial drilling stage as well. It should also be appreciated that the embodiments described herein are equally applicable to wellsite or laboratory applications where the workflow is carried out on one or more rock samples, such as core samples or drill cuttings, that originate from the geological formation GF.

Figures 6A, 6B:
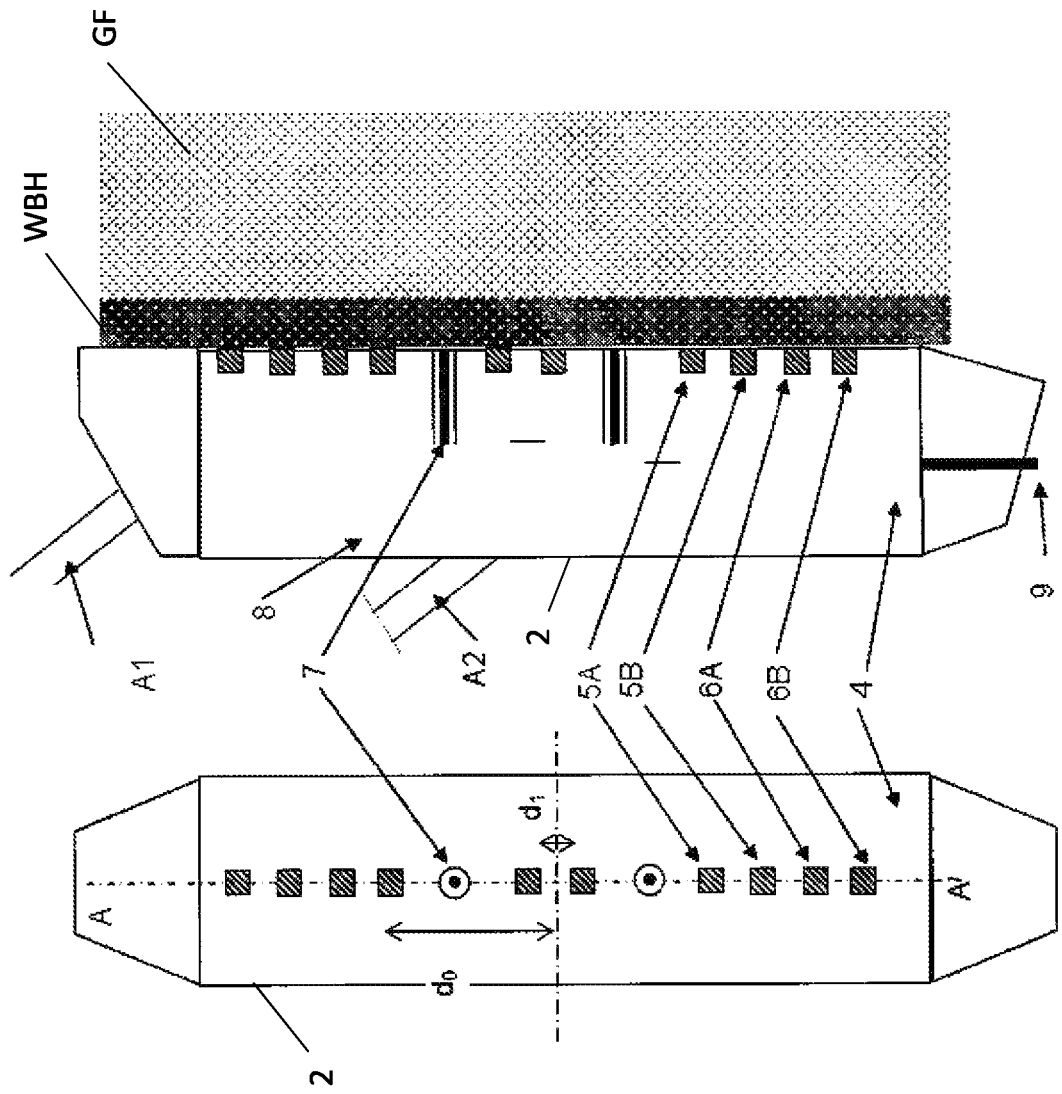
FIGS. 6A and 6B are schematic diagrams of two different profile views of a dielectric dispersion logging tool.

FIGS. 6A and 6B are schematic diagrams of two different profile views of a dielectric dispersion logging tool that can be included as part of the logging tool TL and configured to perform dielectric dispersion measurements as part of the workflows described herein in order to investigate the geological formation GF traversed by the wellbore WBH. The profile of FIG. 6A is viewed as seen from the geological formation GF, while the profile of FIG. 6B is viewed side-on to the geological formation GF showing the tool aligned adjacent to mudcake MC. During drilling, the wellbore WBH is filled with the fluid mixture DM, generally drilling fluid and drilling mud and the wall of the wellbore screens particles of mud suspended in the fluid mixture. Thus, a shallow layer of mud, the so-called mudcake MC is generally formed on the wall WBW of the wellbore. A flushed or invaded zone forming a first concentric volume surrounds the wall WBH. The fluid mixture DM generally filtrates through the mudcake MC and penetrates into the formation, forming the invaded zone. A true or virgin zone surrounds the invaded zone. It is filled with the natural geological formation fluid. A further transition zone may be present between the invaded zone and the virgin zone.

As shown in FIGS. 6A and 6B, the dielectric dispersion logging tool includes a pad 2 for measuring the electromagnetic properties of the geological formation GF. The pad 2 is a conductive metal housing, for example, made in a metallic material like stainless steel. The pad 2 is coupled to the tool TL by arms A1 and A2 that enables the deployment of the pad 2 from the tool TL. Once the dielectric dispersion logging tool is positioned at a desired depth, the pad 2 can be deployed from the logging tool TL against the wellbore wall WBW by an appropriate deploying arrangement, for example by the arms A1 and A2. The pad 2 houses two transmitters and eight receivers distributed axially along its length. Specifically, there are four receivers located above the upper transmitter 7, another four receivers 5A, 5B, 6A and 6B located below the lower transmitter and two further receivers located between the upper 7 and lower transmitter.

It is possible to configure the two transmitting antennas to define a central point between them. Each antenna is spaced from a distance d0 from the central point. The distance d0 sensibly defines the electromagnetic probe depth of investigation, whereas the distance d1 between the two transmitters sensibly defines the vertical resolution, for example 1 inch. The eight receiving antennas can be grouped into sets, for example 4 sets wherein each set comprising two receiving antennas positioned on each side of the transmitting antennas. By varying the spacing of the sets of receiving antennas from the central point it is possible to vary the depth of investigation of the tool. That is, the respective sets of receiving antennas, being at different spacings (from the central points), are able to investigate at different radial depths into the formation.

Thus, the transmitter/receiver arrangement relies on electromagnetic wave propagation for dielectric dispersion measurements. The general principle of these measurements is to emit a propagating electromagnetic field at a transmitter. The propagating electromagnetic field passes through the near wellbore geological formation GF and is received by the receivers. The frequency of the propagating electromagnetic field can be varied over multiple frequencies for the dielectric dispersion measurement. The dielectric dispersion measurement acquires data that is dependent on dielectric properties of the geological formation GF as a function of frequency. Details of the dielectric dispersion tool are set forth in co-owned U.S. Pat. No. 8,636,061, herein incorporated by reference in its entirety.

Figure 7:
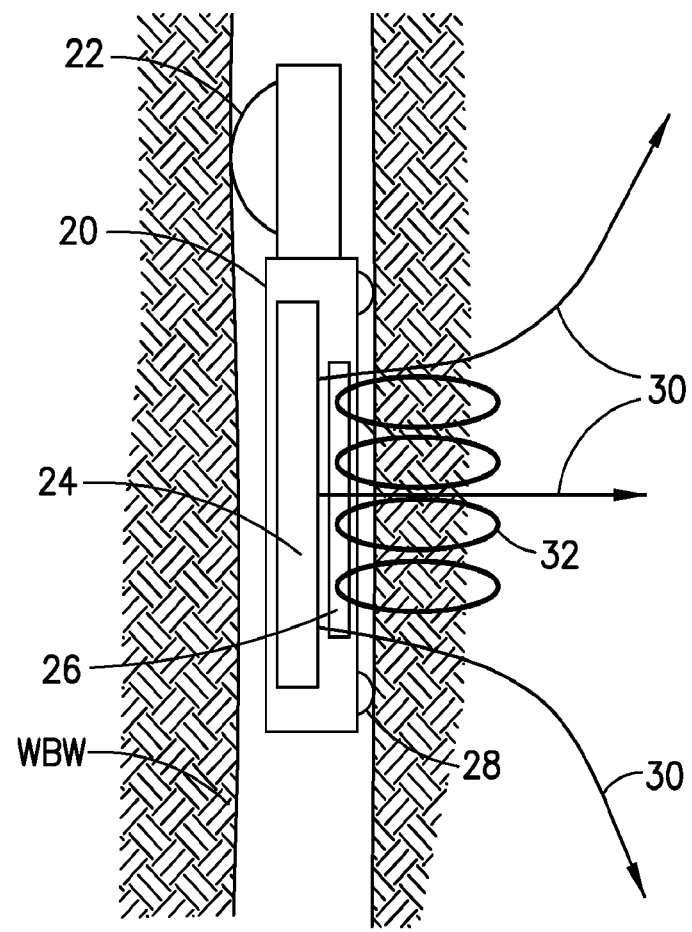
FIG. 7 is a schematic diagram of an NMR logging tool.

FIG. 7 is a schematic diagram of an NMR logging tool 20 that can be integrated as part of logging tool TL of FIG. 5 and configured to perform NMR measurements as part of the workflows described herein in order to investigate the geological formation GF traversed by the wellbore WBH. The tool 20 has mechanism 22 (such as a bowspring or retractable arm) that can be configured to press the body of the tool 20 against the wellbore wall WBW via standoff spacers 28 during logging. The spacers 28 and mechanism 22 help compensate for the rugosity of the wellbore WBW while keeping the tool positioned closely to the side of the wellbore under investigation. Although tool 20 shown in the embodiment of FIG. 7 has a single body, the tool 20 may obviously comprise separate components such as a cartridge, sonde or skid, and the tool 20 may be combinable with other logging tools as would be obvious to those skilled in the art.

The tool 20 also includes a sensor that includes one or more magnets 24 and an array of RF antenna elements 26. The magnet(s) 24 generate a static magnetic field B0 (depicted as arrows 30) having a static field direction substantially perpendicular (90°) to the longitudinal axis of the tool 20. Each RF antenna element of the array 26 generates an oscillating RF magnetic field B1 (depicted as ovals 32) in the region under investigation (or sensitive zone) that is substantially perpendicular to both the longitudinal axis of the tool 20 and to the primary static field direction. It will be understood that the present disclosure may be applicable to other tool configurations.

The tool 20 also includes an electronics cartridge or electronics that is operably coupled to the RF antenna elements of the array 26 and configured to cooperate with the antenna elements of the array 26 to make a measurement in the region of investigation (sensitive zone). Such measurements involve magnetically reorienting the nuclear spins of particles in the geological formation GF by pulses of the oscillating magnetic field B1 transmitted by the RF antenna elements of the array 26 and then detecting the NMR signals received by the RF antenna elements of the array 26 which result from the precession of the tipped particles in the static magnetic field B0 within the region of investigation over a period of time. The electronics cartridge or electronics can be configured to perform NMR measurements as part of the workflow described herein.

In other embodiments, other NMR logging tools, laboratory NMR spectrometers and any other NMR spectrometer can be configured to perform NMR measurements as part of the workflow described herein.

Note that the dielectric dispersion and NMR measurements of the workflow can be performed at different depths in the wellbore in order to investigate different parts of the geological formation that is traversed by the wellbore, and the processing of the workflow can be repeated for the corresponding dielectric dispersion and NMR measurements at respective depths in order to determine tortuosity of rock and fluid phase for the different parts of the geological formation.

Figure 8:
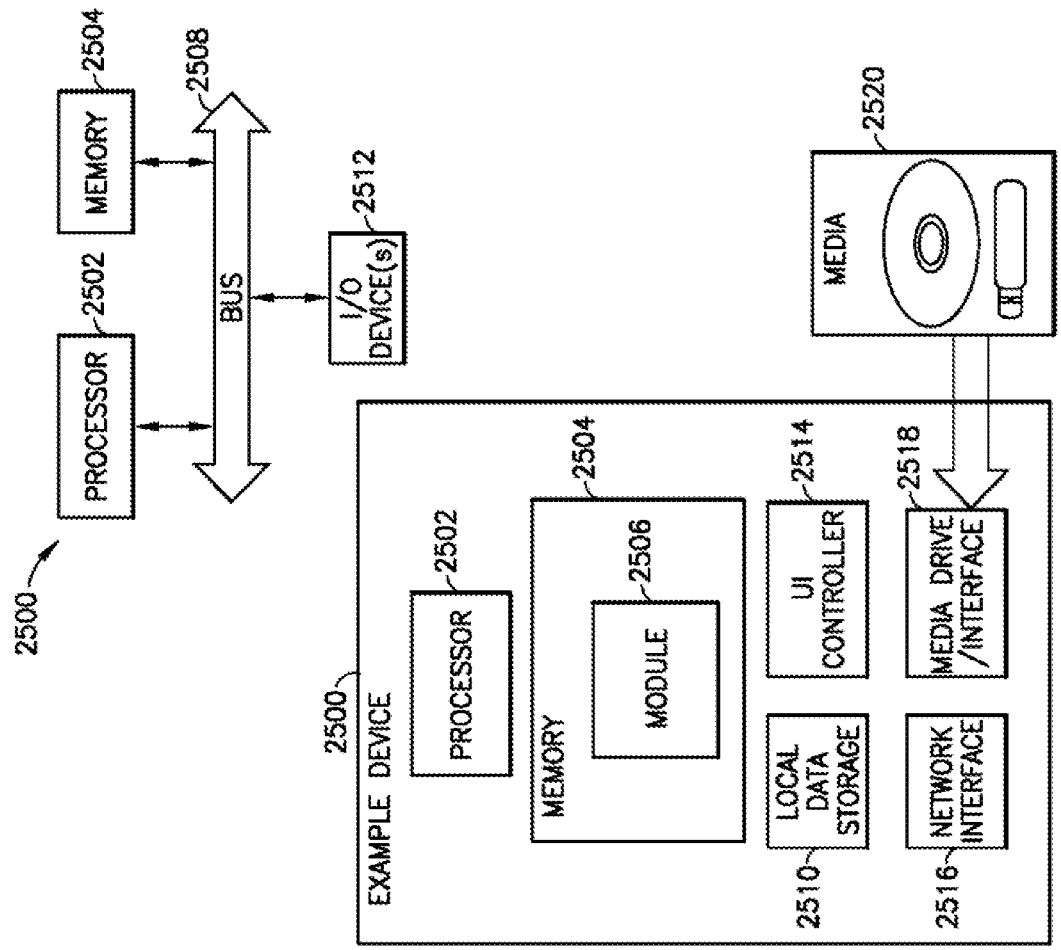
FIG. 8 is a schematic diagram of a computer system.

FIG. 8 illustrates an example device 2500, with a processor 2502 and memory 2504 that can be configured to implement various embodiments of the workflow described herein. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network.

A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518. Various processes of the present disclosure or parts thereof can be implemented by instructions and/or software programs that are elements of module 2506. Such instructions and/or software programs may reside on removable media 2520 readable by media drive/interface 2518 as is well known in the computing arts.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes of the present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

In embodiments, some of the methods and processes described above are performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

There have been described and illustrated herein one or more embodiments of methods and systems that employ a combination of Nuclear Magnetic Resonance (NMR) measurement(s) and dielectric dispersion measurement(s) to determine data that characterizes tortuosity of a porous media (such as reservoir rock) and data that characterizes tortuosity of fluid phases in the porous media. It will therefore be appreciated by those skilled in the art that yet other modifications could be made to the provided invention without deviating from its spirit and scope as claimed.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method of characterizing tortuosity of a porous media, wherein the porous media is saturated with both a water phase and a hydrocarbon phase, comprising:
   using results of at least one NMR measurement and at least one dielectric dispersion measurement performed on the porous media to determine data that characterizes tortuosity of a porous media and data that characterizes tortuosity of fluid phases in the porous media;
   wherein the results of the at least one NMR measurement comprises Diffusion D-$T_2$ data of the porous media;
   analyzing a part of the Diffusion D-$T_2$ data that is attributable to pores filled with water to determine an NMR-based water phase tortuosity;
   determining a dielectric-based water phase tortuosity by inversion of the at least one dielectric dispersion measurement; and
   using the dielectric-based water phase tortuosity as data that characterizes water phase tortuosity of the porous media and analyzing a part of the Diffusion D-$T_2$ data that is attributable to pores filled with hydrocarbon to determine hydrocarbon phase tortuosity of the porous media.

2. A method according to claim 1, wherein:
   the data that characterizes tortuosity of fluid phases in the porous media includes a value of a first parameter representing tortuosity of a water phase and a value of a second parameter representing tortuosity of a hydrocarbon phase in the porous media.

3. A method according to claim 2, further comprising:
   computing a value of a third parameter that characterizes tortuosity of the porous media using the water phase tortuosity determined from the results of the at least one NMR measurement and the water phase tortuosity determined from the results of the at least one dielectric dispersion measurement.

4. A method according to claim 3, wherein:
   the third parameter comprises a saturation exponent n of the porous media.

5. A method according to claim 1, further comprising:
   performing the at least one dielectric dispersion measurement on the porous media to obtain the results of the at least one dielectric dispersion measurement; and
   performing the at least one NMR measurement on the same or similar porous media to obtain the results of the at least one NMR measurement.

6. A method according to claim 1, wherein:
   data that characterizes rock tortuosity of the porous media comprises a cementation exponent m of the porous media.

7. A method according to claim 1, further comprising:
   determining a saturation exponent n of the porous media based on the NMR-based water phase tortuosity and the dielectric-based water phase tortuosity.

8. A method according to claim 1, wherein:
   the porous media is selected when the NMR-based water phase tortuosity does not match the dielectric-based water phase tortuosity or the water saturation parameter $S_w$ is less than 1.

9. A method according to claim 1, wherein:
   the porous media is reservoir rock.

10. A method according to claim 9, wherein:
    the at least one NMR measurement and the at least one dielectric dispersion measurement are each performed on a near wellbore volume of reservoir rock by a downhole logging tool.

11. A method according to claim 9, wherein:
    the at least one NMR measurement and the at least one dielectric dispersion measurement are each performed on a sample of reservoir rock by a laboratory apparatus or wellsite apparatus.

12. A method according to claim 11, wherein:
    the sample of reservoir rock comprises a plug or core sample or drill cuttings.

13. A method according to claim 1, which is performed by a processor.

14. A computer processor configured to characterize tortuosity of a porous media, wherein the porous media is saturated with both a water phase and a hydrocarbon phase, by using results of at least one NMR measurement and at least one dielectric dispersion measurement performed on the porous media to determine data that characterizes tortuosity of a porous media and data that characterizes tortuosity of fluid phases in the porous media;
    wherein the results of the at least one NMR measurement comprises Diffusion D-$T_2$ data of the porous media;
    analyzing a part of the Diffusion D-$T_2$ data that is attributable to pores filled with water to determine an NMR-based water phase tortuosity;
    determining a dielectric-based water phase tortuosity by inversion of the at least one dielectric measurement; and using the dielectric-based water phase tortuosity as data that characterizes water phase tortuosity of the porous media and analyzing a part of the Diffusion $D$-$T_2$ data that is attributable to pores filled with hydrocarbon to determine hydrocarbon phase tortuosity of the porous media.

\* \* \* \* \*